E. E. TOWLE.
CORN PLANTER.
APPLICATION FILED NOV. 30, 1908.

930,106.

Patented Aug. 3, 1909.
2 SHEETS—SHEET 1.

Witnesses:

Inventor
Elmer E. Towle
By
Attorneys

E. E. TOWLE.
CORN PLANTER.
APPLICATION FILED NOV. 30, 1908.
930,106.
Patented Aug. 3, 1909.
2 SHEETS—SHEET 2.
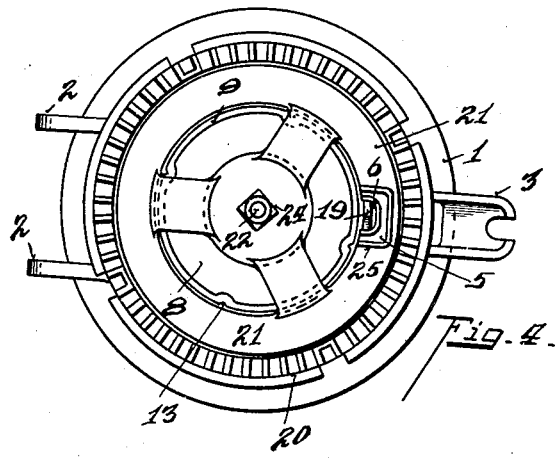
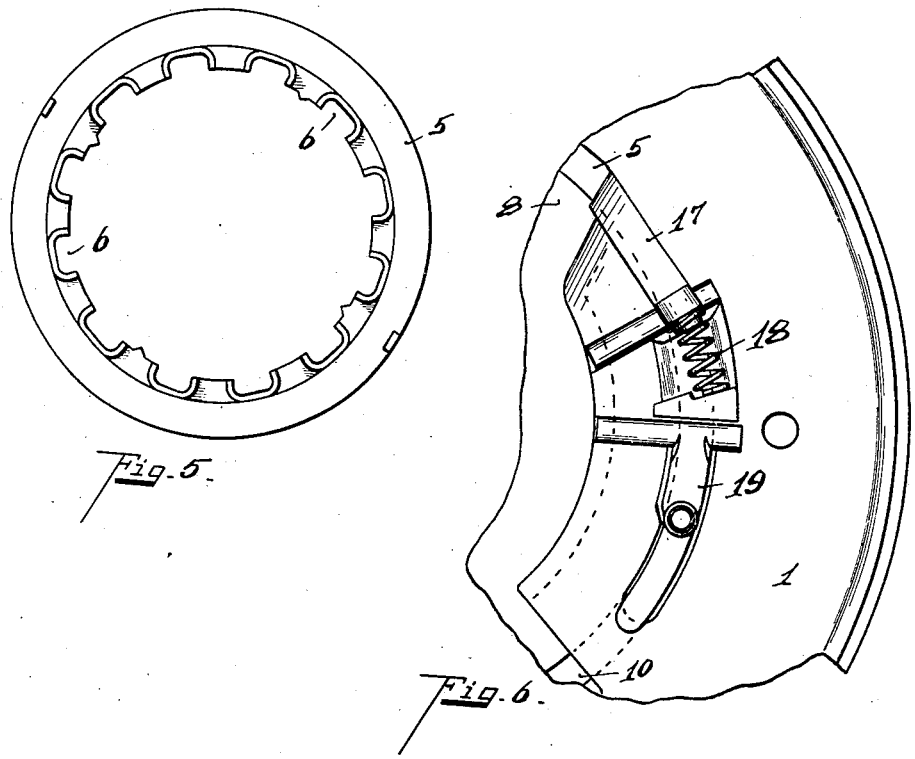
Witnesses
Inventor
Elmer E. Towle
By
Attorneys

UNITED STATES PATENT OFFICE.

ELMER E. TOWLE, OF RICHMOND, INDIANA, ASSIGNOR TO THE AMERICAN SEEDING MACHINE COMPANY, OF SPRINGFIELD, OHIO, A CORPORATION OF OHIO.

CORN-PLANTER.

No. 930,106.    Specification of Letters Patent.    Patented Aug. 3, 1909.

Application filed November 30, 1908. Serial No. 465,237.

*To all whom it may concern:*

Be it known that I, ELMER E. TOWLE, a citizen of the United States, residing at Richmond, in the county of Wayne and State of Indiana, have invented certain new and useful Improvements in Corn-Planters, of which the following is a specification.

The object of my invention is to provide a seed dropper for a corn planter, which will accurately feed and drop the seed of the corn serially continuous without injury to the kernels.

A feature of the invention consists in employing a seed ring provided with cells abutting a central seed supporting plate, the parts being so disposed as to form a seed channel terminating at the point of cut-off, at which point the top of the cells are substantially on a level with the central plate, said channel being of greater depth at points opposite thereof, so as to secure a proper filling of the cell with an individual kernel, which result is produced by the inclination of the central disk or plate forming the inner boundary of the seed channel.

The features of the invention are more fully set forth in the description of the accompanying drawings, forming a part of this specification, in which:—

Figure 1:
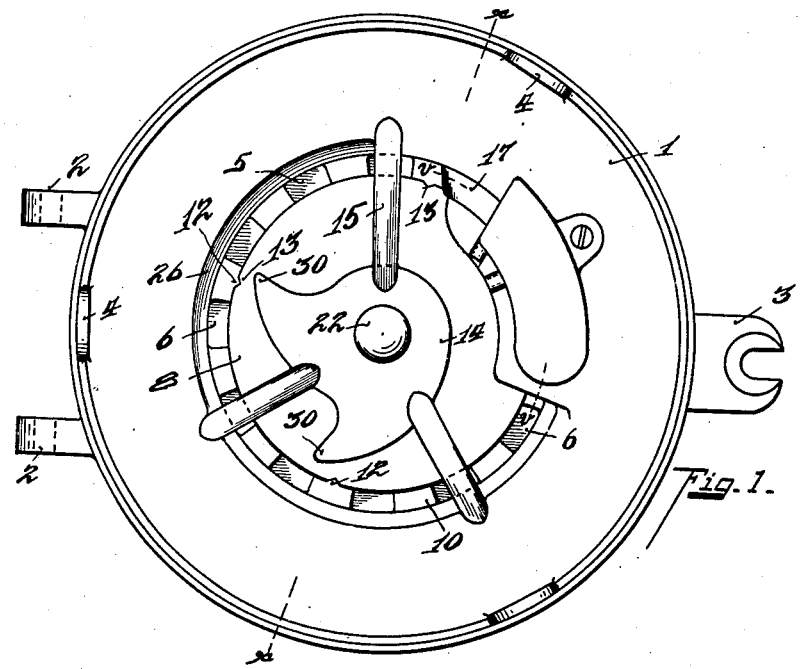
Figure 2:
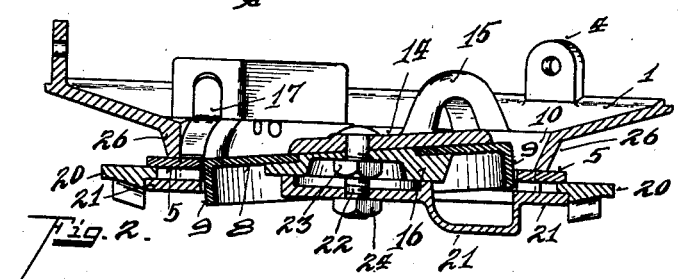
Figure 3:
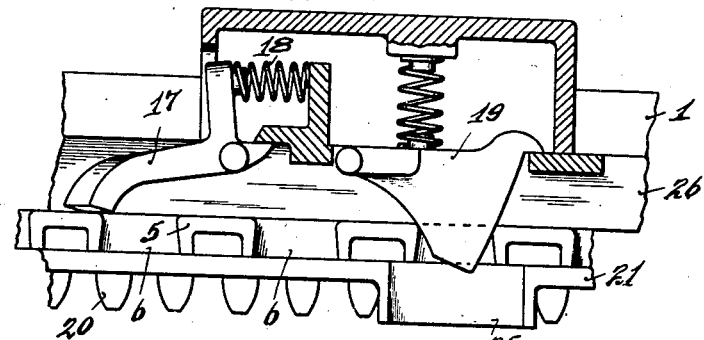

Figure 1 is a top plan view of the seed dropper. Fig. 2 is a section on line *x*, *x*, Fig. 1. Fig. 3 is a section on line *v*, *v*, Fig. 1. Fig. 4 is a bottom plan view of the seed dropper. Fig. 5 is a bottom plan view of the seed cell ring. Fig. 6 is an enlarged detail top plan view of cut-off and seed discharge lever, shown in elevation, Fig. 3.

1 represents a hopper base having a depending marginal flange forming the outer boundary of the seed channel.

2 represents ears for hinging the hopper base to the frame or support. 3 represents a lug projecting from said base for locking the same in position.

4 represents ears to which the shell of the hopper is attached.

5 represents a seed cell ring.

6 represents the cells into which the kernels of the corn drop, as the ring is traveling or rotating toward the point of delivery.

8 represents a central disk inside of the cell ring. It is provided with an annular flange 9 which forms the inner boundary of the seed channel 10. The ring or disk is preferably made to rotate in unison with the cell ring, and for this purpose the cell ring is provided with one or more lugs 12, projecting into notches 13, formed in the flange 9 of the disk 8, as shown in Fig. 1. The central disk is mounted at an angle to the horizontal plane of the cell ring, as shown in Fig. 2, for purposes which will be hereinafter explained.

14 represents a central plate supported by arched spider arms 15 formed integral with the base 1.

16 represents an inclined bearing for the central disk 8. The plate 16 and the central plate 14 are preferably made in two pieces for convenience of construction and assembly.

17 represents a pivoted cut-off finger bearing against the spring 18, its point normally resting upon the cell ring 5 and disk 8, see Figs. 1 and 2.

19 represents a pivoted spring controlled discharge finger of usual form of construction. The cut-off and discharge fingers are shown in their normal position in relation to the cell ring.

20 represents a driving gear ring detachably connected to the cell ring 6. This gear is driven in any well-known manner not shown.

21 represents a bearing plate for the said ring 5. It is rigidly secured to the central plate 14 and inclined plate 16 by means of the bolt 22, said plate maintaining the cell ring and gear in position. The bearing plates 21, and 16, are disposed in angular planes to give the ring 5 and disk 8 planes of rotation in different angles with their adjacent edges always coincident at one point, so that at their positions of non-coincidence the outer face of the flange 9, the inner face of the hopper 1, and the ring 5, form the sides and bottom of the seed channel. The nut 23 secures the inclined plate against the central plate 14, and the nut 24 secures the base plate against the inclined plate.

25 represents a delivery chute for the seed formed integral and projecting from the base plate 21 and in alinement with the discharge finger.

The seed way or channel 10 formed between the annual flange 9 and the inclined flange 26 of the hopper base 1, is of greater depth above the cell ring at points nearly opposite the cut-off 17, see Fig. 2, while the top of the central disk is approximately on a level with the cell ring at the cut-off. This construction is important for the following reasons: As the cell ring approaches the cut-off it carries a kernel of corn in the cell, other kernels resting upon it are pushed aside by the cut-off and pass freely inwardly on the central disk, without danger of being injured. It is preferred to have the central disk revolved in unison with the ring, so that the surplus seed may be carried around and dropped into the seed channel 10. The object is to keep the seed channel 10 filled with seed and the cells individually filled with a single kernel, the top of the cell to be open and directly in the path of the seed channel. By this construction a positive filling of each of the cells with an individual seed is obtained, and a smooth and easy separation of the kernels or seeds resting upon the individual seed in the cell is readily accomplished by the cut-off and passed on the central disk inside the cell, without danger of displacement of the individual seed in the cell and without danger of breaking any of the seeds by the action of the cut-off in the separation of the mass from the individual seed.

The central stationary plate 14 is shown as provided with cam-shaped deflecting points 30 for the purpose of directing the seed into the seed channel. The central disk 8, if made stationary, provided the inclination of the same to the cell ring was maintained, would serve a highly useful purpose, but better results are obtained by causing the said disk to revolve in unison with the cell ring.

As shown in the drawings, the driving gear carrying the cell ring is of the form known as the intermittent rotation in common use, but the seeding hopper and constituent parts are adapted to use in corn planters, having a continuous rotation and valve mechanism provided with periodical trips for dropping seed in hills, that may be used instead of the intermediate rotating gear with equally good results. This seeding device also may be used for drilling corn or seed by employment of the usual accessory devices commonly employed in drilling corn planters. This corn dropper is, therefore, adapted and can be used with the various forms of planters and mechanism now employed for dropping corn in hills or for drilling corn by planting each seed individually a given space apart from the next seed.

By means of the construction and operation of the parts herein shown and described a more uniform delivery of the seed is obtained and the danger of injuring or destroying the seed is obviated.

The cell ring shown and described as the preferred form of construction, has cells, each of which is adapted to hold appropriately a single seed or kernel of corn, which is the form usually preferred in ordinary seeding, but it is obvious that the advantages of filling the cells and dropping the seeds in the same from the mass in the hopper will be obtained if the cells were made to hold two or more seeds or kernels of corn, without departing from the principles of this invention.

The essential feature of the device is the means for bringing the adjacent edges of the plate and holder into and out of coincidence during each rotation, thereby forming a definite seed-way where the adjacent edges are non-coincident. The main feature of the invention comprises the rotatable seed ring and its concentric disk disposed at angular planes, so as to give their adjacent edges a point of coincidence at which the seed can pass from one member to the other, at their positions of non-coincidence, the side edge of the disk rising above the seed ring, so as to form therewith and with the adjacent surface of the hopper, a seed channel. In this way, the seeds are more efficiently discharged from the hopper in uniform quantities and they are preserved from any injury when subjected to the influence of the moving parts within the hopper.

Having described my invention, I claim:—

1. A seed hopper, a seed carrier, and a disk concentric therewith, the disk and carrier arranged in different planes with their edges coincident only at one point, whereby a seed-way is formed between the hopper, carrier and non-coincident part of the disk, and means for rotating the carrier and disk.

2. In combination, a rotatable seed carrier, and a rotatable disk disposed at an angle to the carrier and concentric therewith, said disk and carrier being coincident at one point.

3. A container, a rotatable seed ring, and a rotatable disk within the ring, the ring and disk arranged in different planes with their adjacent edges in the same plane at the discharge point.

4. A seed feeder comprising an outer wall, a rotatable discharge member, an inner rotatable member concentric with the discharge member and disposed in a different plane, the edges of the rotatable members being coincident at one point.

5. A seed discharger comprising a rotatable seed ring having cells, and an inner rotatable member concentric therewith, the ring and member being disposed in different planes with their adjacent edges in the same plane at the discharge point.

6. A seed-hopper, a seed carrier and a disk concentric therewith, the disk and carrier being arranged in different planes with their edges coincident at only one point, whereby the seed-way is formed between the hopper, carrier and non-coincident part of the disk, and means for rotating the carrier.

7. A seed-hopper, a seed carrier and a disk concentric therewith, bearings for said carrier and disk arranged in different planes, whereby the disk and carrier have their edges coincident at one point and forming the seed-way between the ring, disk and hopper at their non-coincident positions, means connecting the disk and ring, whereby they rotate in unison and permitting of the relative movement of the disk in following its plane of rotation, and means for rotating the ring.

8. In combination with a rotatable seed carrier and a rotatable disk disposed at an angle to the carrier and concentric therewith, said carrier and disk being coincident at one point, and a stationary deflecting member secured on the face of the disk, and adapted to direct the seed deposited on the disk onto the carrier.

9. A seed feeder comprising a hopper, a rotatable seed carrier, an inner concentric member disposed in a different plane, the edges of the rotatable members being coincident at one point, thereby forming a seed-channel at their positions of non-coincidence, and means for discharging seed from the carrier.

10. In combination with a rotatable seed carrier and a concentric disk disposed at an angle to the carrier, said disk and carrier being coincident at one point, said disk and carrier being formed with connections, whereby they rotate in unison but permitting of the relative movements incident to their different planes of rotation.

11. A seed hopper formed with a discharging chute, a rotatable seed ring, having cells, an inner rotatable member concentric with the ring, the ring and member being disposed in different planes with their adjacent edges having one point of coincidence, a spring actuated member engaging the face of the ring over the cells adapted to prevent the overcharging of the cells, and a spring actuated discharging member adapted to automatically engage into and out of the cells as they are moved across the seed opening.

12. A seed hopper, angularly disposed bearing plates disposed within the hopper, a seed ring formed with cells supported on one of said bearing plates, said bearing plate formed with an opening for discharging seed from the hopper through the cells, a concentric disk within the ring mounted on said other bearing plate, said bearing plates providing the ring and concentric member with a point of coincidence at their adjacent edges, and means for rotating said seed ring.

13. In combination with a rotatable seed carrier and rotatable disk disposed at an angle to the carrier and concentric therewith, said carrier and disk being coincident at one point, and means for deflecting the seed from the disk onto the carrier.

14. A seed hopper, angularly disposed bearing plates disposed within the hopper, a seed ring formed with cells supported on one of said bearing plates, said bearing plate formed with an opening for discharging seed from the hopper through the cells, a concentric disk within the ring mounted on said other bearing plate, said bearing plates providing the ring and concentric member with a point of coincidence at their adjacent edges, means for rotating said seed ring, and an automatic discharger adapted to push the seed from the cells into the discharge opening of the bearing plate as they are successively brought into juxtaposition by the rotation of the carrier.

In testimony whereof, I have hereunto set my hand.

ELMER E. TOWLE.

Witnesses:
 EDWARD CHRISTMAN,
 S. H. JONES.